(12) United States Patent
Odisho

(10) Patent No.: US 9,472,044 B2
(45) Date of Patent: Oct. 18, 2016

(54) COAT CHECK SYSTEM

(71) Applicant: Sam Munassar Odisho, Lake Villa, IL (US)

(72) Inventor: Sam Munassar Odisho, Lake Villa, IL (US)

( * ) Notice: Subject to any disclaimer, the term of this patent is extended or adjusted under 35 U.S.C. 154(b) by 0 days.

(21) Appl. No.: 14/875,952

(22) Filed: Oct. 6, 2015

(65) Prior Publication Data

US 2016/0125685 A1  May 5, 2016

Related U.S. Application Data

(60) Provisional application No. 62/075,400, filed on Nov. 5, 2014.

(51) Int. Cl.
*B65G 17/20* (2006.01)
*G07F 7/04* (2006.01)
*G07F 7/08* (2006.01)
*G07F 17/10* (2006.01)

(52) U.S. Cl.
CPC ............... *G07F 17/10* (2013.01); *B65G 17/20* (2013.01); *G07F 7/04* (2013.01); *G07F 7/08* (2013.01)

(58) Field of Classification Search
CPC ............ G07F 17/10; G07F 7/04; G07F 7/08; B65G 17/20
USPC .............................. 198/678.1; 186/53; 221/76
See application file for complete search history.

(56) References Cited

U.S. PATENT DOCUMENTS

| | | | | |
|---|---|---|---|---|
| 3,840,103 A * | 10/1974 | Willis | ..................... | D06F 95/00 186/14 |
| 3,917,112 A * | 11/1975 | Willis | ..................... | D06F 95/00 186/14 |
| 4,303,503 A * | 12/1981 | de Mimerand | ........ | B65G 47/61 198/367 |
| 5,000,309 A * | 3/1991 | Dooley | ................ | B65G 17/485 105/149 |
| 5,141,094 A * | 8/1992 | Speckhart | ............ | B65G 47/493 198/349 |
| 5,509,572 A * | 4/1996 | Curtis | ........................ | G07F 7/00 198/411 |
| 5,687,850 A * | 11/1997 | Speckhart | ............. | B07C 5/3412 209/2 |
| 6,010,239 A * | 1/2000 | Hardgrave | ................. | G07F 7/00 700/213 |
| 6,170,642 B1 * | 1/2001 | Galan | ................... | B65G 1/0457 198/346.1 |
| 6,578,671 B2 * | 6/2003 | Shen | ....................... | G06Q 30/06 186/35 |
| 7,837,106 B2 * | 11/2010 | Fabre | .................... | B65G 1/1376 235/375 |
| 7,886,971 B2 * | 2/2011 | Cassady | .................. | D06F 95/00 235/381 |
| 2007/0251990 A1 * | 11/2007 | LeNorman | .............. | G07F 17/20 235/375 |

* cited by examiner

*Primary Examiner* — Mark A Deuble

(57) ABSTRACT

A coat check system is provided to replace traditional coat check services with a conveyor assembly, storage units, and a control terminal. The need for human attendants is negated, with patrons at establishments interacting with the control terminal in order to gain access to one of the storage units. A drive mechanism moves the storage units along a track of the conveyor assembly, with the storage units being moved toward an item transfer section to grant a patron access to one of the storage units. The storage unit can be open (for example a simple hangar) or enclosed, including a lateral surface, floor, drain, air vent, and door for access. Interaction with the control terminal is facilitated by a user input device and an information output device which are mounted into a housing of the control terminal. Multiple payment options and wireless connectivity are also provided for the control terminal.

17 Claims, 16 Drawing Sheets

US 9,472,044 B2

COAT CHECK SYSTEM

The current application claims a priority to the U.S. Provisional Patent application Ser. No. 62/075,400 filed on Nov. 5, 2014.

FIELD OF THE INVENTION

The present invention relates generally to a conveyor assembly with a plurality of storage units, the conveyor assembly being controlled through a control terminal. The present invention is provided to replace traditional coat check services.

BACKGROUND OF THE INVENTION

Coatrooms are often found at entrances to nightclubs, theaters, concert halls, large restaurants, and museums, giving guests or customers a place to store their coats, hats, and other outerwear or personal items. Attended coatrooms, or coat checks, are staffed rooms where such items can be stored for a nominal fee, usually in exchange for the added security of having a staff member present in the room at all times to keep watch over people's belongings. Typically, a ticket or receipt is given to the customer, with a corresponding ticket attached to the garment or item. This helps the staff keep track of people's items as well as helps to deter thieves from trying to claims other people's items as their own.

However, this type of system is not without its faults. Though handing out coat check tickets is quicker and simpler than recording individuals' names, it does not preclude some problems from arising. For example, in a large, crowded venue, staff members are unlikely to remember every person that has checked a coat or other item. If a person loses his or her ticket, then that person has no way to verify that any of the items in the coatroom are his or hers. Even if a person can identify his or her belongings by what they look like, the staff may have to haphazardly sort through a large number of items before finally finding the correct item. Furthermore, traditional coat check services do not preclude less-than-honest staff members sifting through people's garments to steal valuable items that were accidentally (or purposely) left behind.

The present invention provides users with an efficient system for safely storing their coats and belongings at public venues. The present invention may utilize a number of different types of automated conveyor systems that can be operated through a computer interface, eliminating the need for staffed coatrooms and thus providing an option for replacing traditional coat check services. The exact specifications of the present invention may vary, and the present invention may be utilized in many different applications.

DETAIL DESCRIPTIONS OF THE INVENTION

Figure 1:
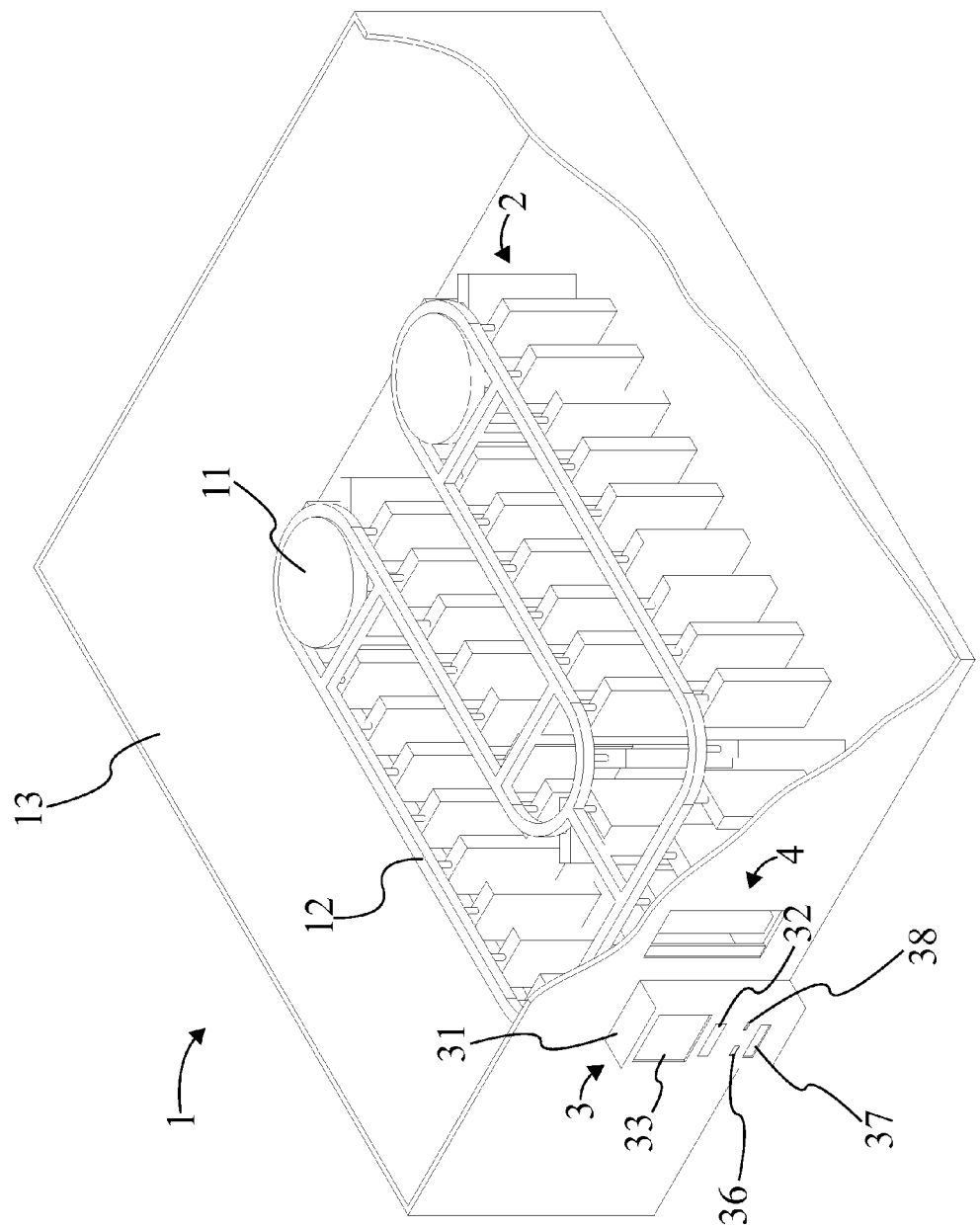
FIG. 1 is a perspective view of the present invention, showing an embodiment with a single conveyor track.

All illustrations of the drawings are for the purpose of describing selected versions of the present invention and are not intended to limit the scope of the present invention.

The present invention is a coat check system that allows for storage of outerwear (e.g. coats) and other personal belongings at establishments such as restaurants and music venues. The present invention is provided to store such personal effects until a user returns to retrieve said effects at a later time. In support of this, the present invention comprises a conveyor assembly 1, a plurality of storage units 2, and a control terminal 3. The plurality of storage units 2, each of which is able to house the belongings of an individual, are moved between a storage area and access area by the conveyor assembly 1. The control terminal 3 allows a user to interact with the present invention; the control terminal 3 directs movement of the plurality of storage units 2 along the conveyor belt and enables users to easily make payments and deposit or retrieve their belongings from one of the plurality of storage units 2. The components of the present invention are illustrated in FIG. 1-FIG. 7 while the process of the present invention is detailed via FIG. 8-FIG. 16.

Elaborating upon the foundation of the present invention, the conveyor assembly 1 comprises a drive mechanism 11, a track 12, and a conveyor enclosure 13. The drive mechanism 11 provides the means for moving the plurality of storage units 2 between positions, while the track 12 creates a path that the plurality of storage units 2 move along. The conveyor enclosure 13 serves to separate the drive mechanism 11 and track 12 from control terminal 3; this provides an element of security for stored belongings, as the plurality of storage units 2 will be sealed off from general access. The conveyor enclosure 13 is thus laterally positioned around the track 12 and the drive mechanism 11, with the control terminal 3 being positioned exterior to the lateral enclosure. The plurality of storage units 2 is moveably engaged along the track 12 while the drive mechanism 11 is mechanically integrated along the track 12. The drive mechanism 11 is thus able to impart movement to the plurality of storage units 2; activating the drive mechanism 11 moves the plurality of storages units along the track 12.

The control terminal 3, allowing for operation of other components of the present invention, is communicably coupled to the conveyor. The control unit is thus able to direct movement of the plurality of storage units 2 along the track 12. Through the control terminal 3, a user can resultantly gain access to an empty storage unit 2 in which personal belongings can be secured. The user can later access that same storage unit 2; by interacting with the control terminal 3, the user recalls the storage unit 2 and can collect their belongings. A user is thus able to leave their personal belongings in a secure location and conveniently retrieve said belongings at a later point in time. The conveyor assembly 1, plurality of storage units 2, and control terminal 3 are shown together in FIG. 1.

In different embodiments of the present invention, different combinations of drive mechanisms 11 and tracks 12 can be implemented as part of the conveyor assembly 1. For example, the track 12 can be elevated (e.g. suspended from a ceiling or raised above a floor 23) while the conveyor system can be implemented as a chain conveyor or a belt conveyor. As the present invention is often used with garments, a number of conveyor implementations that are used by dry cleaning businesses are well suited for use with the present invention. However, ultimately the present invention can utilize any track 12 and drive mechanism 11, as long as said track 12 and drive mechanism 11 are able to move the plurality of storage units 2 along the track 12.

While it is possible for one embodiment to omit the conveyor enclosure 13, this would result in the track 12, drive mechanism 11, and the plurality of storage units 2 being completely open to any persons in the area of the present invention. In certain embodiments with individually secured storage units 2 this may be feasible. However, ultimately it is preferably that the conveyor assembly 1 comprises the conveyor enclosure 13.

Preferably, to facilitate user interaction with the present invention, an item transfer section 4 is provided. The item transfer section 4 serves as region adjacent to the track 12 and the control terminal 3. This positioning allows a user to operate the control terminal 3 and access one of the plurality of storage units 2 from the same spot. The item transfer section 4 is integrated into the conveyor enclosure 13, with the control terminal 3 being positioned both exterior to the conveyor enclosure 13 and adjacent to the item transfer section 4.

This adjacent positioning of the control terminal 3 to the item transfer section 4 is not required. For example, the control terminal 3 and the item transfer section 4 could be separated; this could allow a second user to begin interacting with the control terminal 3 while a first user walks to the item transfer section 4 and empties a storage unit 2 of their personal belongings. Such a configuration could potentially increase efficiency of the present invention.

Figure 2:
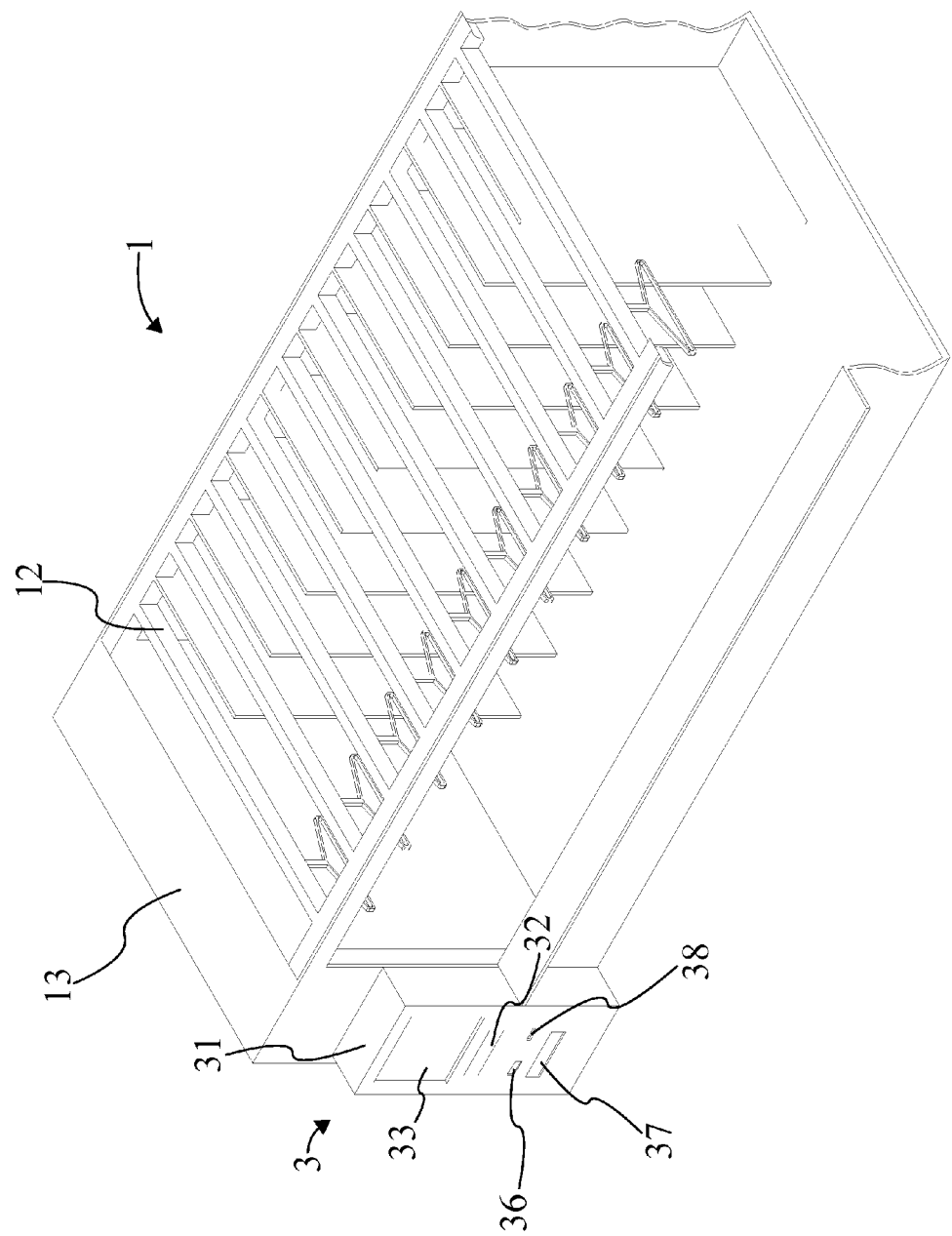
FIG. 2 is a perspective view of the present invention, showing an embodiment with multiple conveyor tracks.
Figure 3:
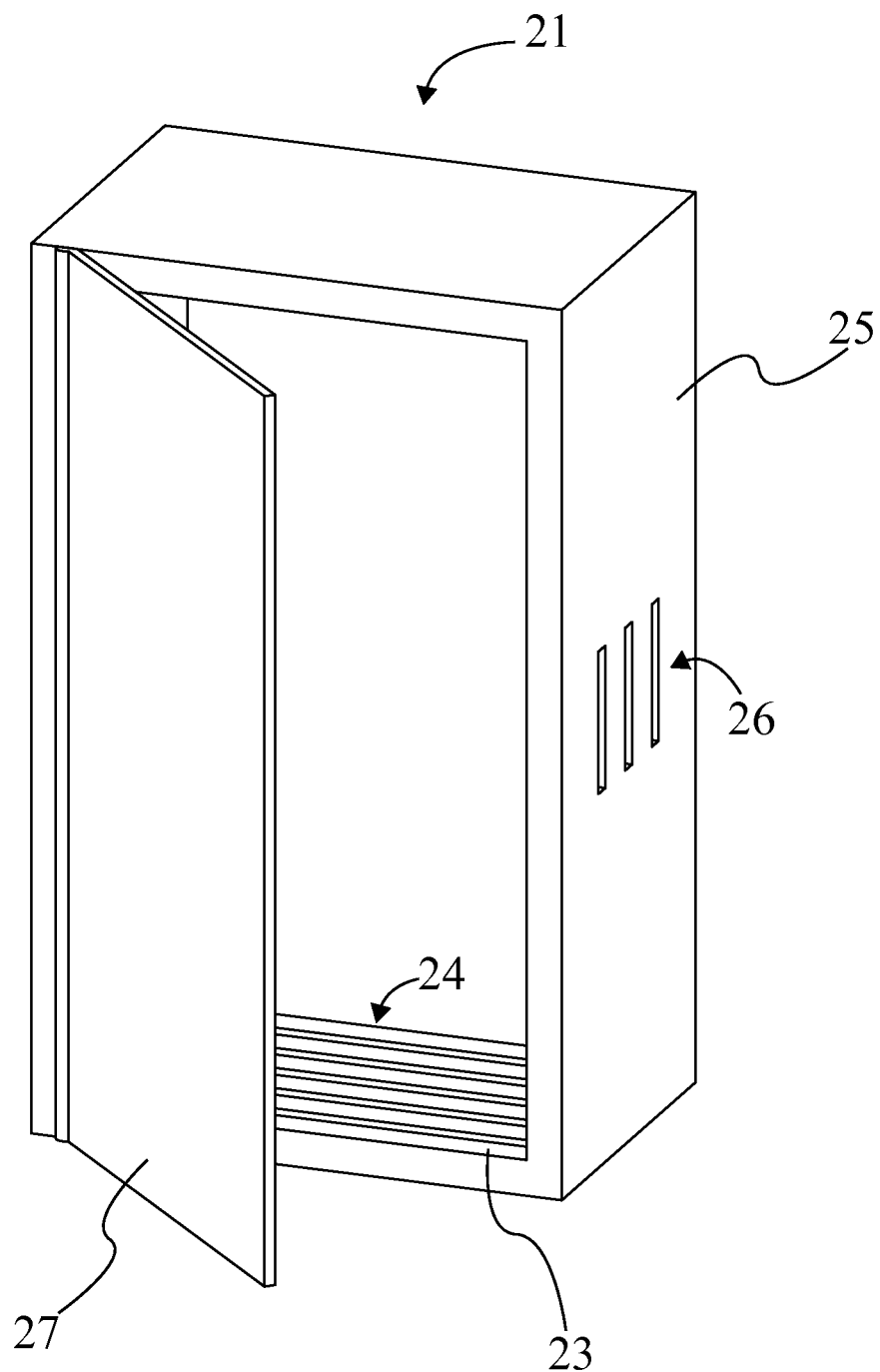
FIG. 3 is front perspective view of an enclosed container embodiment of the present invention.
Figure 4:
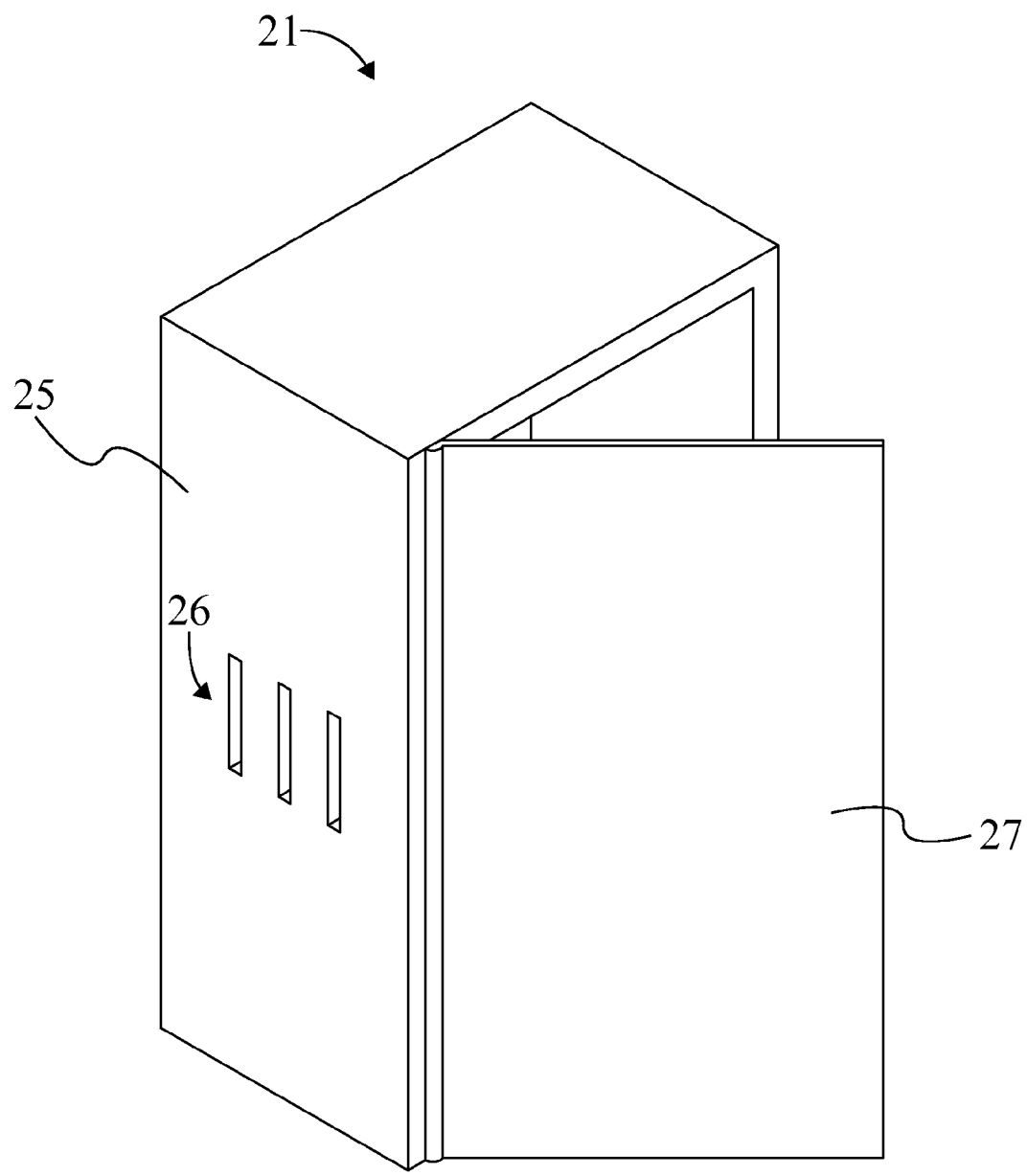
FIG. 4 is a left perspective view of the enclosed container embodiment of the present invention.
Figure 5:
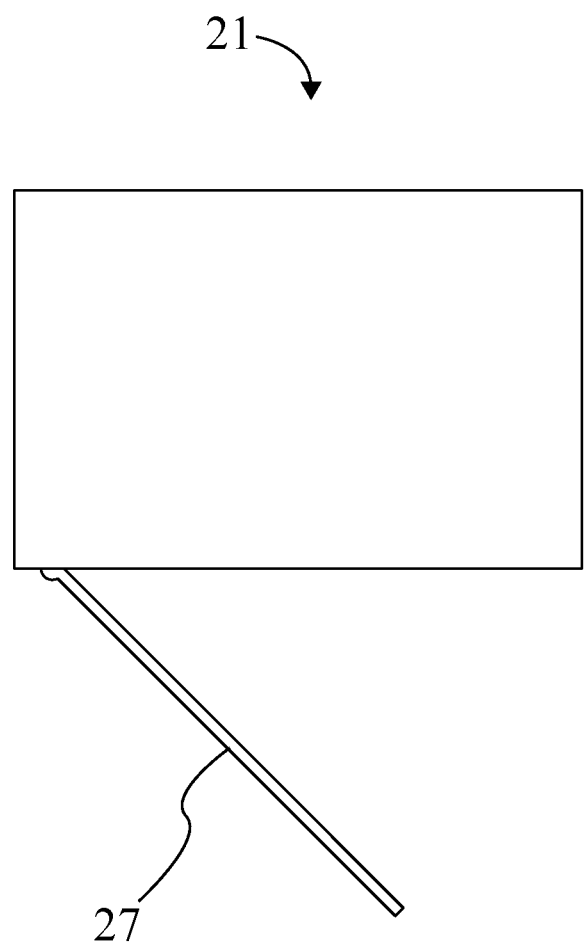
FIG. 5 is a top plan view of the enclosed container embodiment of the present invention.
Figure 6:
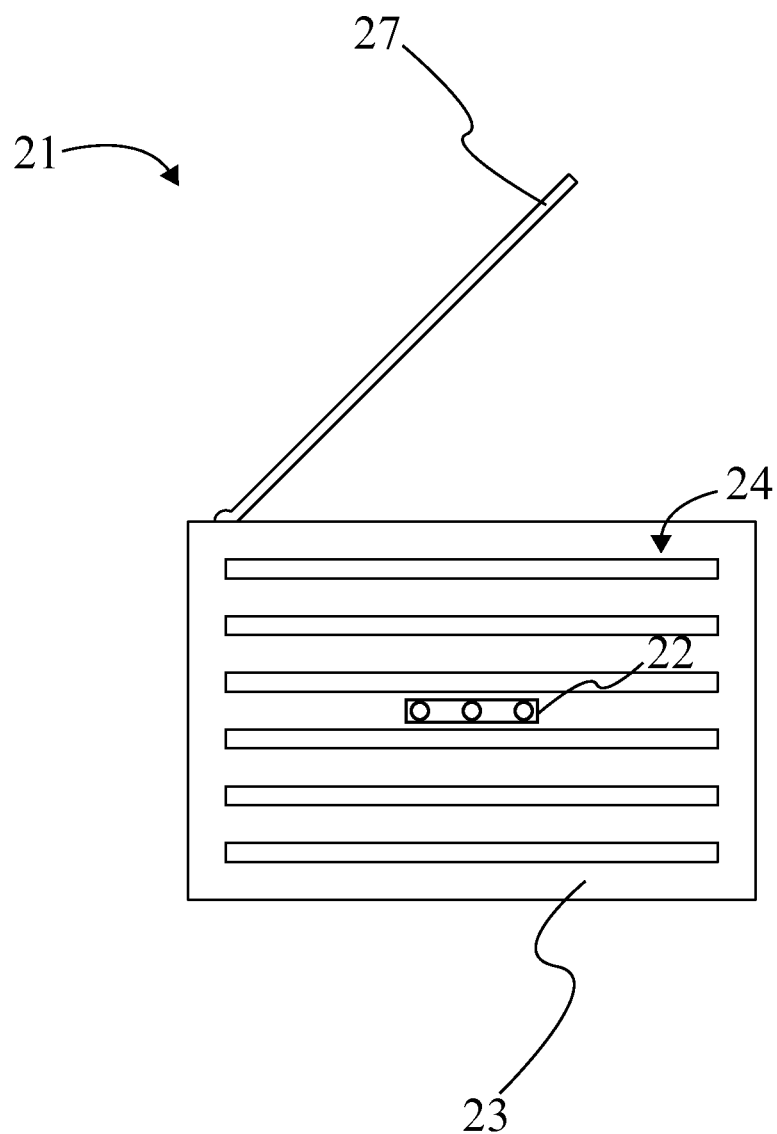
FIG. 6 is a bottom plan view of the enclosed container embodiment of the present invention.

Another possibility is the addition of multiple tracks 12 (along with corresponding drive mechanisms 11), control terminals 3, and item transfer sections 4. The additions effectively increase the capacity of the present invention, allowing it to handle a higher number of user simultaneously. This could be desirable for establishments that routinely host a large number of patrons or which see a lot of patrons enter and exit within a short timeframe. An example embodiment using such a track 12 configuration is shown in FIG. 2. This illustration also shows how the item transfer section 4 is an open style counter, with a cutaway in the conveyor enclosure 13 leaving the tracks 12 visible.

While the configuration of the track 12, as illustrated, is a continuous loop, different arrangements of the track 12 can be utilized. For example, if multiple tracks 12 are used, each track 12 can be a straight line, with the multiple tracks 12 being parallel with each other.

The plurality of storage units 2, in a most basic configuration can be a simple tool such as hangar; this cost effective implementation is suitable for supporting coats, jackets, and similar outerwear. However, as it is often desirable to store items such as handbags, umbrellas, sunglasses, and other items, it is beneficial to provide a more substantial storage unit 2.

Thus, in one embodiment, each of the plurality of storage units 2 is an enclosed container 21. The enclosed container 21 offers several advantages over a simpler storage unit 2 (e.g. the hangar). One advantages is the ability to support a variety of items, including those that cannot easily be secured to a hangar. Additionally, an enclosed container 21 can be locked (unlike a hangar) providing more security for the user's belongings. The enclosed container 21 can also be improved upon, as described below, to provide additional benefits over a basic implantation of a storage unit 2.

In one embodiment, the enclosed container 21 comprises a weight sensor 22, the weight sensor 22 being integrated into the enclosed container 21. The weight sensor 22 sense the presence of objects in the enclosed container 21; if a user forgets to completely empty the enclosed container 21, the weight sensor 22 will detect the forgotten items. A buzzer or similar alarm can then be triggered in order to notify the user that they did not retrieve all of their items. This prevents users from accidently leaving items in the enclosed container 21.

In one implementation, the enclosed container 21 comprises a floor 23, with a drain 24 being placed in the floor 23. The integration of the drain 24 through the floor 23 allows for ejection of liquids that have accumulated within the enclosed container 21. For example, in wet weather raingear (e.g. jackets, umbrellas, and even boots) quickly accumulates water, whether within a soft fabric or atop a water repellant layer. The provision of a drain 24 for the enclosed container 21 allows water and other liquids to be evacuated from the enclosed container 21 instead of collecting and forming a pool of water atop the floor 23. This helps to keep the interior of the enclosed container 21 dry in addition to help dry out wet items.

Another implementation of the enclosed container 21 comprises a lateral surface 25, the latter of which supports an air vent 26. By integrating the air vent 26 through the lateral surface 25, circulation of air through the enclosed container 21 is enabled. As with the implementation including a drain 24, this is beneficial when wet or damp items such as rain coats and umbrellas are stored. The air vent 26 enables evaporation of moisture, helping to dry out stored items. Air flow also minimizes odors, as fresh air can constantly be passed through the enclosed container 21. This helps prevent the accumulation of musty or otherwise unpleasant smells within the enclosed container 21 over time. The maintenance of a clean and dry enclosed container 21 help make the present invention more attractive to customers.

Preferably, a door 27 is provided to facilitate access to the interior of the enclosed container 21. Provided a lateral surface 25 of the enclosed container 21, the door 27 is hingedly connected to the lateral surface 25. The door 27 is positioned adjacent to an opening of the lateral surface 25, such that the door 27 blocks the opening when in a closed position and reveals the opening when in an open position. The door 27 also allows for the addition of a lock, helping to secure deposited belongings; a user can be provided with an access code that is paired to a specific enclosed container 21. This ensures that access to any given enclosed container 21 is restricted to approved persons, e.g. one who has deposited belongs in said enclosed container 21. While an access code is referenced, ultimately the user could be provided with any sort of key, whether digital or physical, that provides them with access to the enclosed container 21. This is an added layer of security over the control terminal 3. The enclosed container 21 and related components are illustrated in FIG. 3-FIG. 6. The box shape illustrated allows for storage of a number of items including coats, hats, purses, bags, sunglasses, umbrellas, and water bottles. The interior of the enclosed container 21 may also be fitted with coat hangers, wall hooks, and storage shelves to provide improved storage capabilities.

Elaborating upon the control terminal 3, the control terminal 3 comprises a housing 31, a user input device 32, an information output device 33, and a processing unit 34. The user input device 32 is externally mounted onto the housing 31, where it can be interacted with by a user. For example, the user input device 32 could be a keypad or capacitive touch screen installed onto the exterior of the control terminal 3. Likewise, the information output device 33 is mounted onto the housing 31, allowing a user to receive information from the information output device 33. Preferably, the information output device 33 is a video display or similar visual device, but potentially it could be a speaker or even Braille display, allowing for information to be provided to persons with impaired vision. The processing unit 34, being an internal unit, is mounted within the housing 31. The processing unit 34 effectively connects the components of the control terminal 3 with the drive mechanism 11 of the conveyor assembly 1; as such, the processing unit 34 is electronically connected with the user input device 32 and the information output device 33 while being communicably coupled with the drive mechanism 11.

As a result, the control terminal 3 can receive inputs from a user and send corresponding instructions to the drive mechanism 11. For example, by interacting with a menu displayed through the information output device 33, a user can identify request an empty storage unit 2 or recall their assigned storage unit 2. The control terminal 3 then engages the drive mechanism 11 in order to move the appropriate storage unit 2 to the item transfer section 4. Thus, through the control terminal 3, a user gains access to an empty storage unit 2 (into which personal items can be deposited) or an assigned storage unit 2 (from which personal items can be retrieved). Potentially, in one embodiment, the functions of the control terminal 3 can be integrated into specific storage units 2, with each storage unit 2 having its own input and output devices.

Potentially, a wireless communication module 35 can be mounted within the housing 31. The wireless communication is an internal component that is electronically coupled with the processing unit 34. The wireless communication enables personal electronic devices, such as smart phones and tablets, to interact with the control terminal 3. An advantages of using near field communications to interface personal devices with the control terminal 3 is that input and outputs can be handled directly through said personal devices. The wireless module may be implemented, for example, as part of a wireless networks or otherwise be based on near-field communications (NFC).

In order to allow for monetary transactions, which may be desirable to cover operational costs related to the present invention, the control terminal 3 comprises a cash deposit receptacle 36 and a cash dispensing bin 37. Both the cash deposit receptacle 36 and the cash dispensing bin 37 are integrated into the housing 31; this positioning ensures both components are accessible to users while still being secured into the housing 31. The present invention, through inclusion of these components, is thus able to accept cash payments and render change as necessary.

As monetary transactions are not limited to cash, the control terminal 3 can comprise a card reader 38. The card reader 38 enables the use of several additional payments, primarily credit cards and debit cards. Similar to the cash deposit receptacle 36 and the cash dispensing bin 37, the card reader 38 is integrated into the housing 31 in order to allow a user to access the card reader 38. A user can thus swipe, insert, or otherwise engage their payment card with the card reader 38 in order to make a payment.

Figure 7:
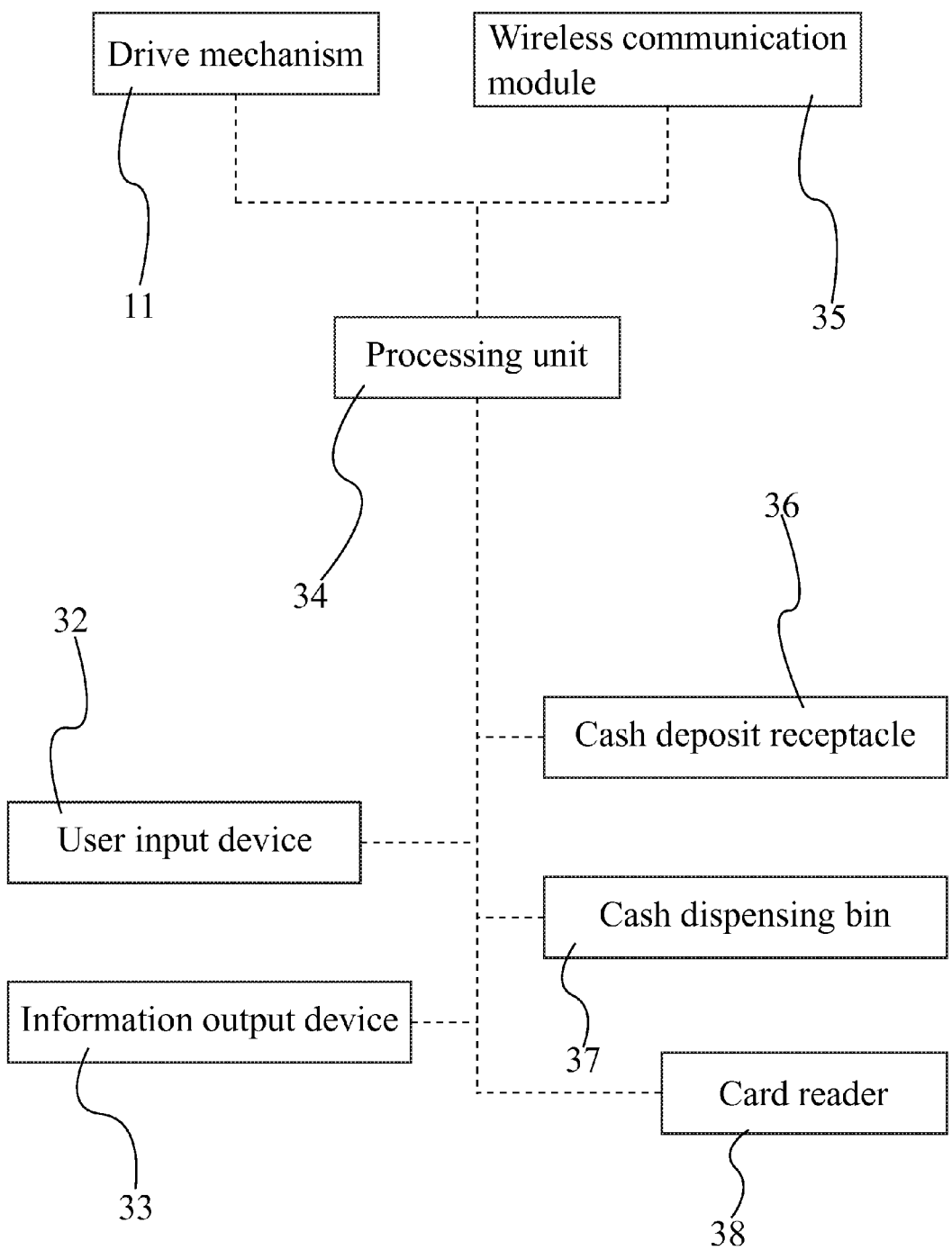
FIG. 7 is a diagram outlining connections of a processing unit and associated components of the control terminal.
Figure 8:
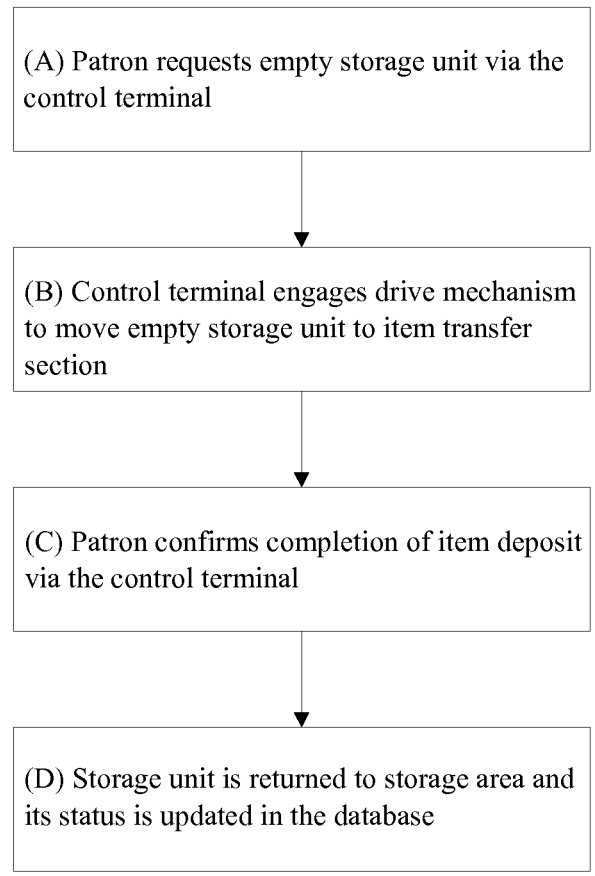
FIG. 8 is a flow diagram outlining a general process by which users may store items with the present invention.
Figure 9:
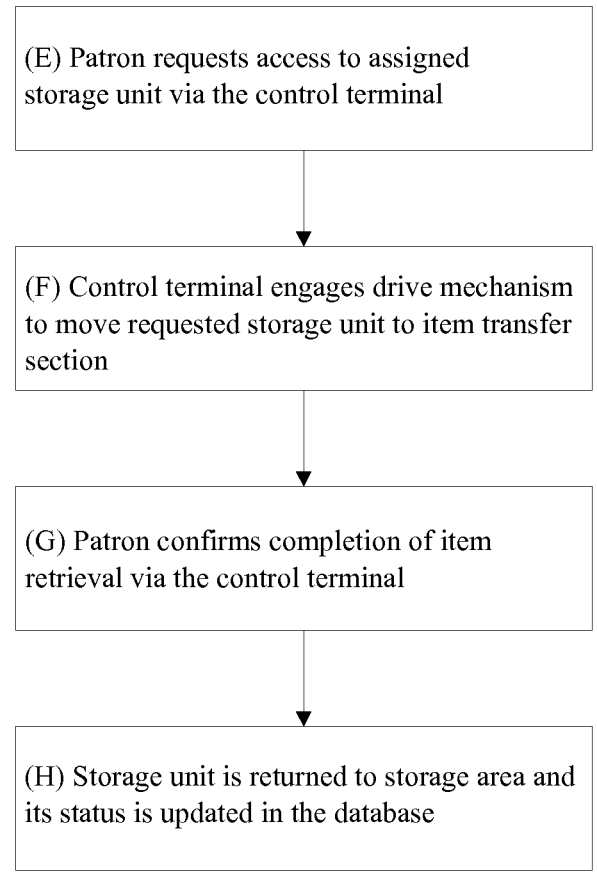
FIG. 9 is a flow diagram illustrating a general process by which users may retrieve previously stored items with the present invention.
Figure 10:
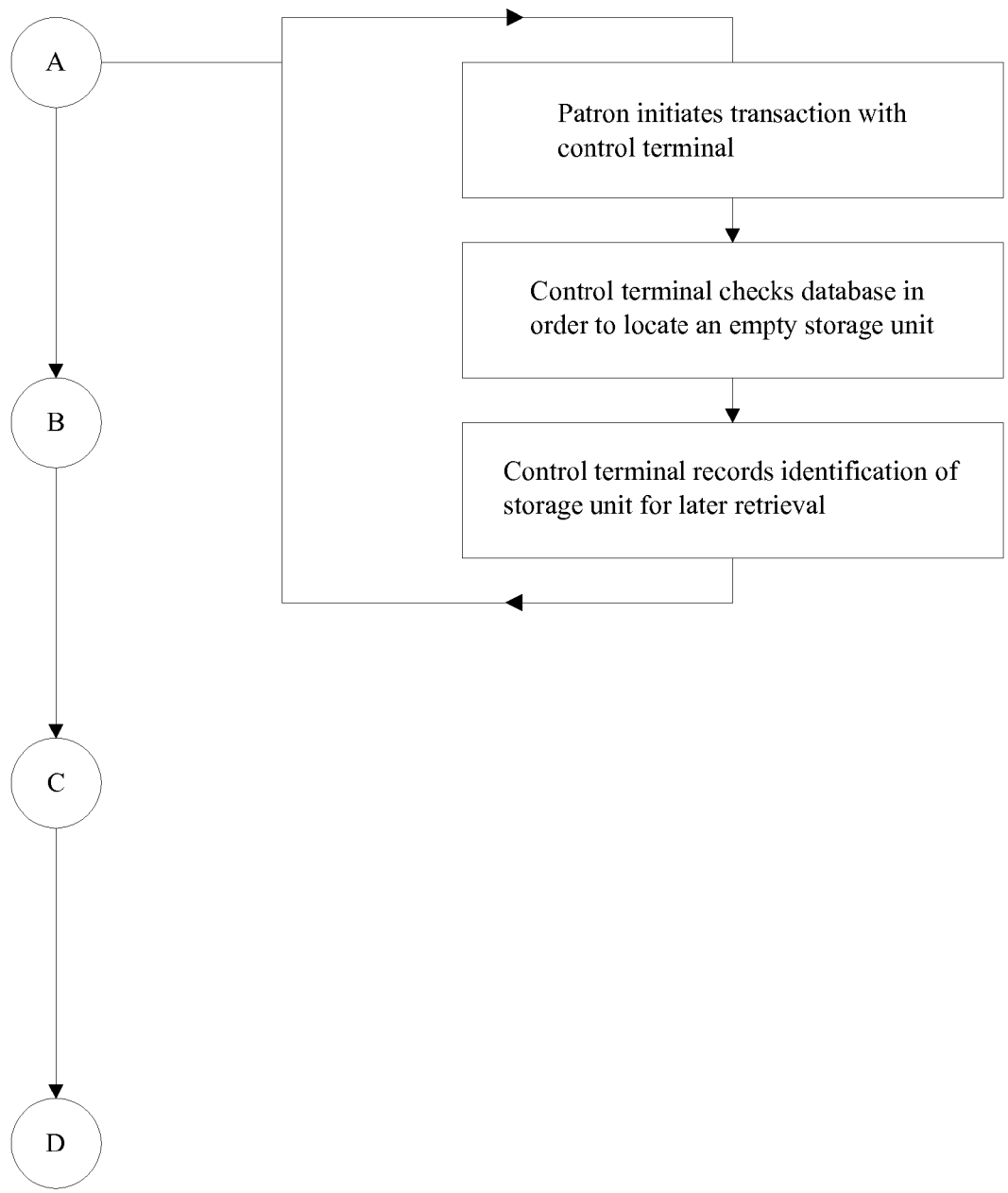
FIG. 10 is a flow diagram illustrating a secondary process utilized by the present invention to initiate the process which allows a user to store items.
Figure 11:
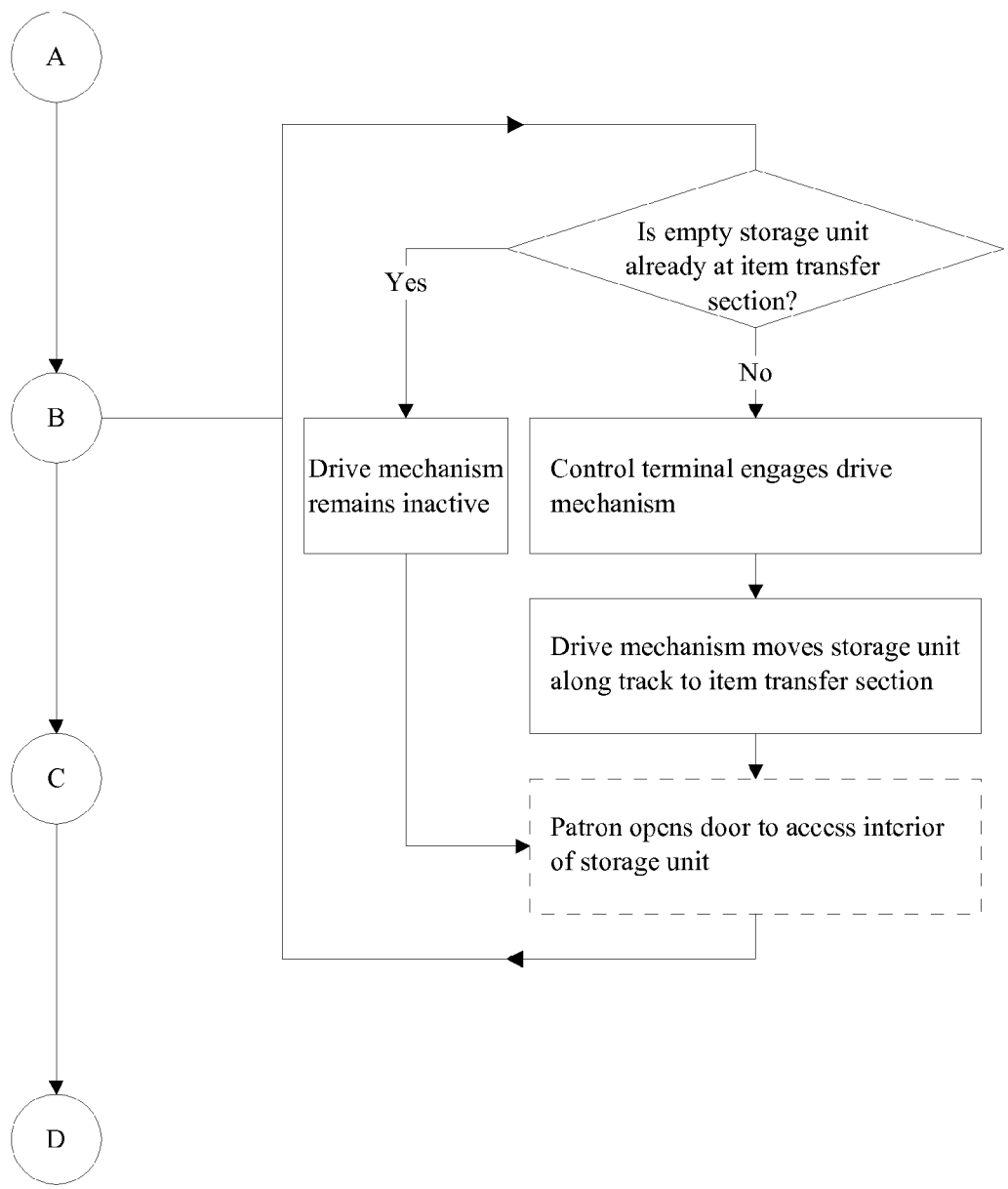
FIG. 11 is a flow diagram illustrating a secondary process utilized by the present invention to provide a user with an empty storage unit.
Figure 12:
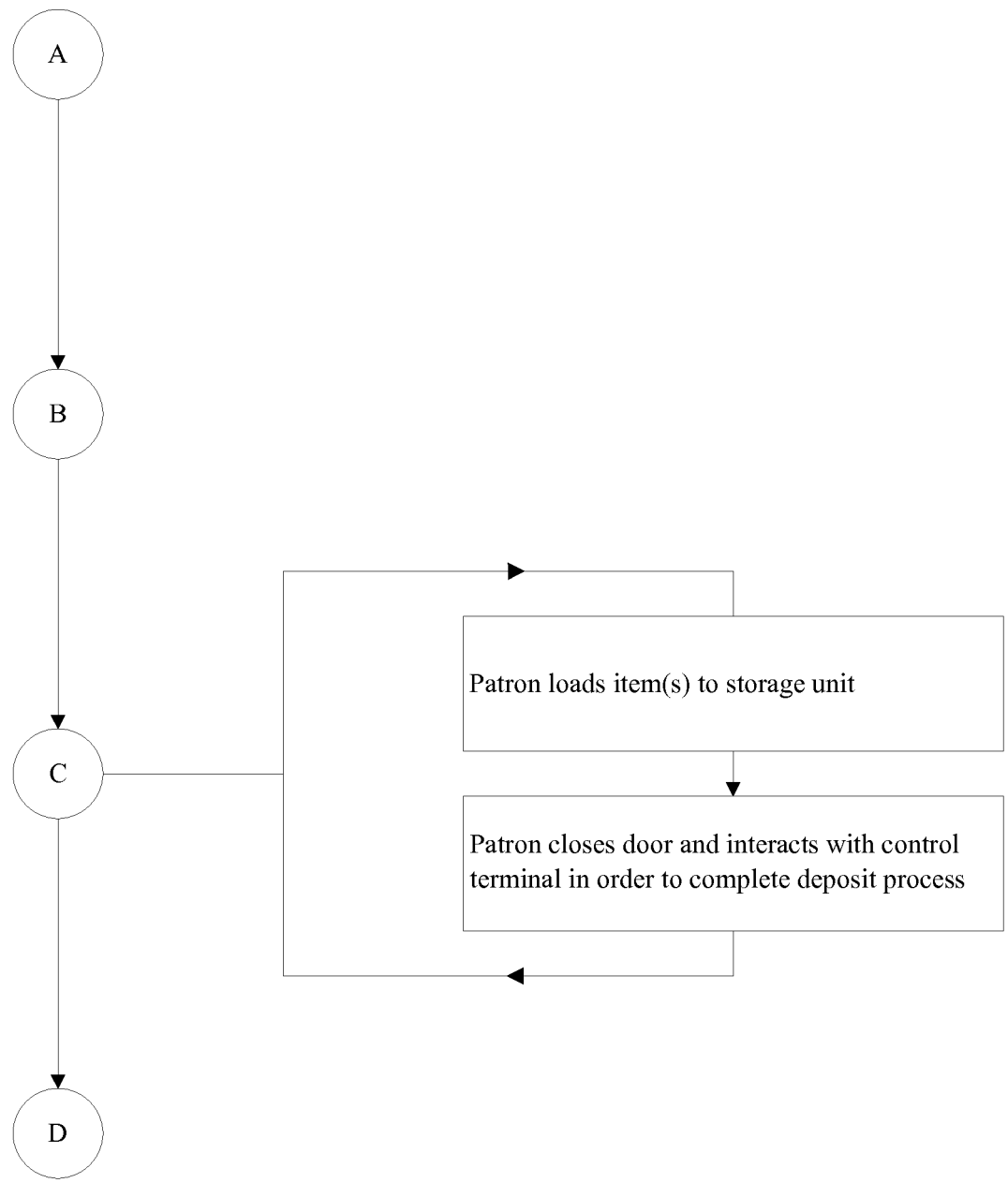
FIG. 12 is a flow diagram illustrating a secondary process utilized by the present invention to confirm when a user has finished placing items in an empty storage unit.
Figure 13:
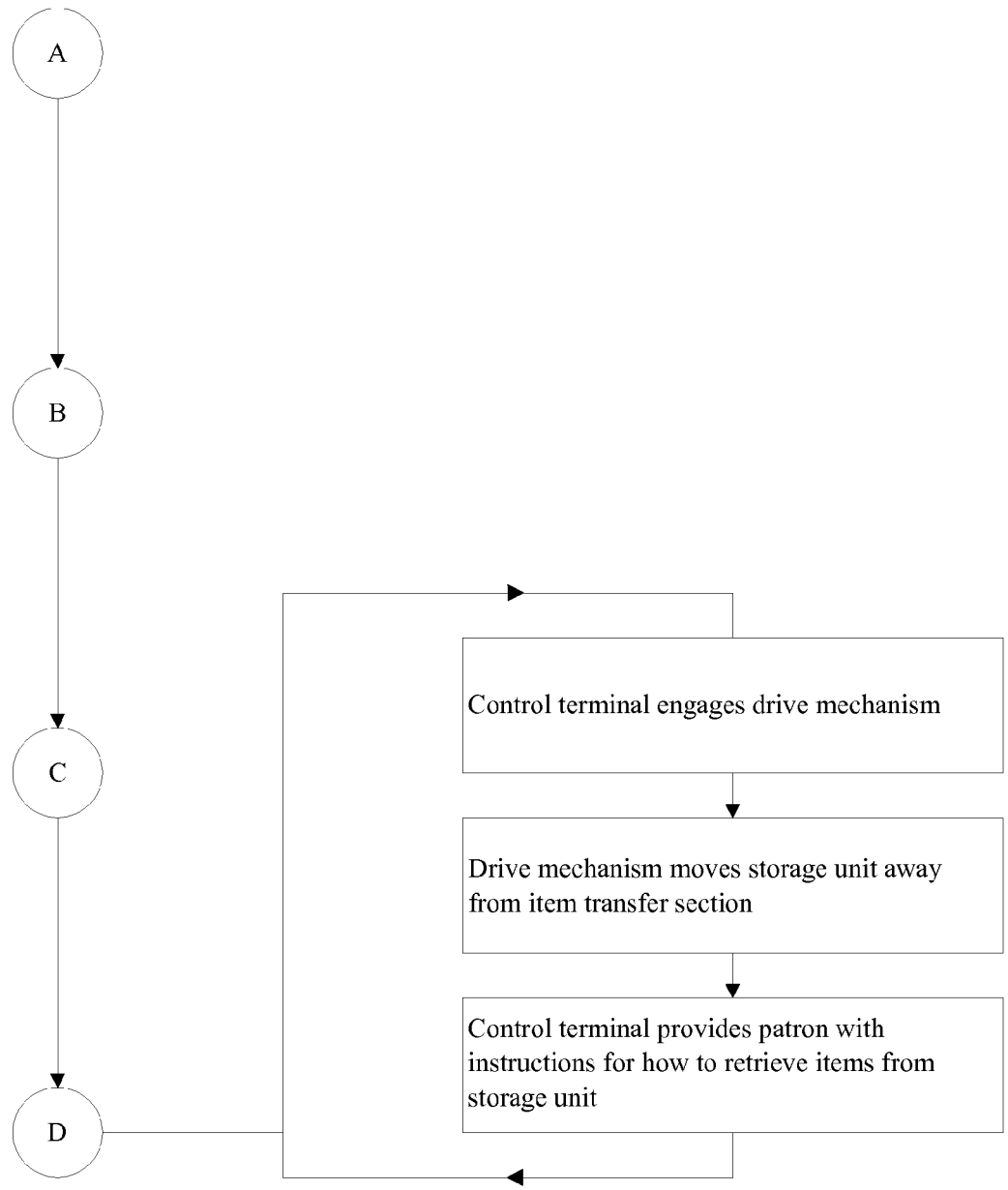
FIG. 13 is a flow diagram illustrating a secondary process utilized by the present invention to complete the process which allows a user to store items.
Figure 14:
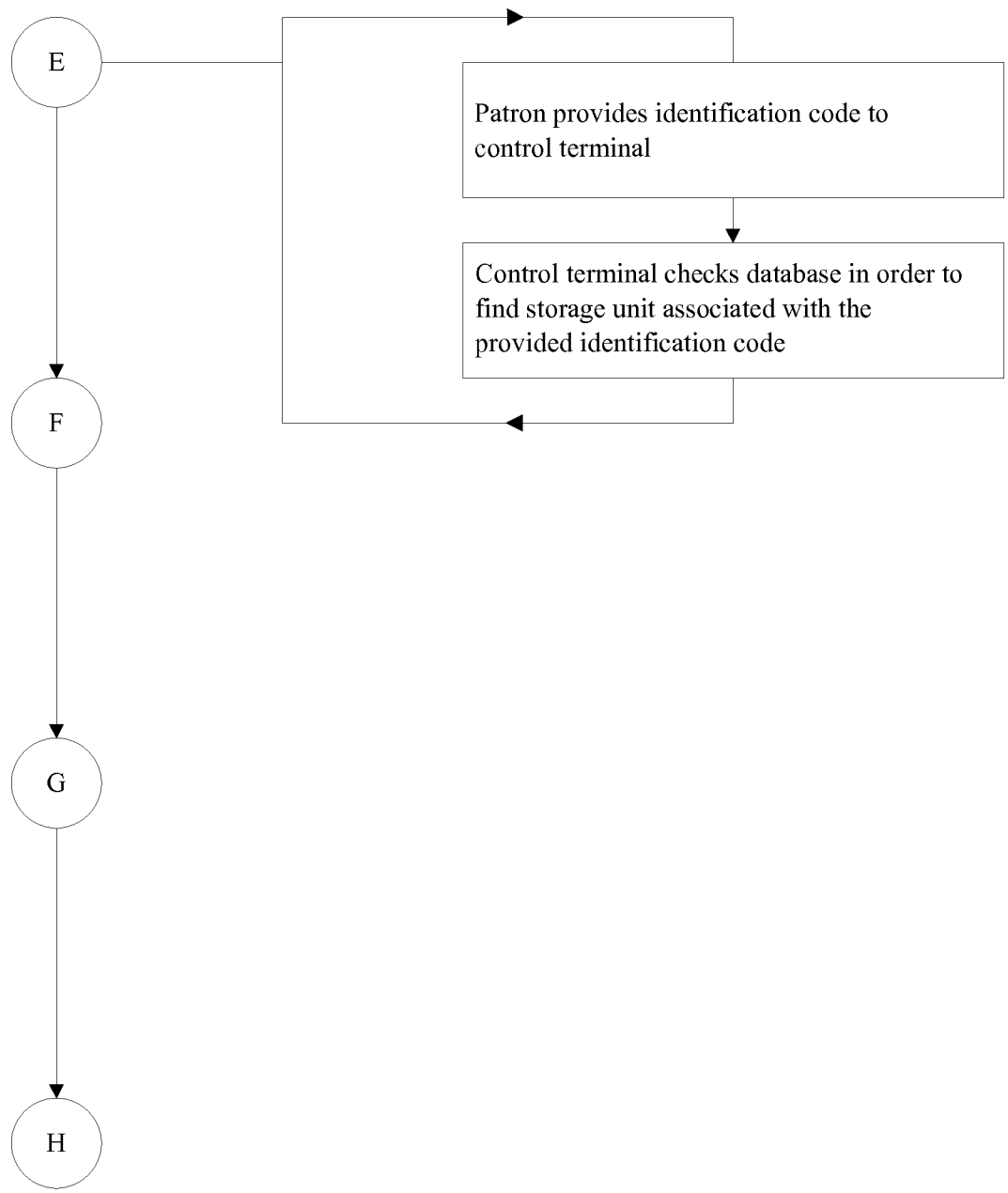
FIG. 14 is a flow diagram illustrating a secondary process utilized by the present invention in initiating the process which allows a user to retrieve previously stored items.
Figure 15:
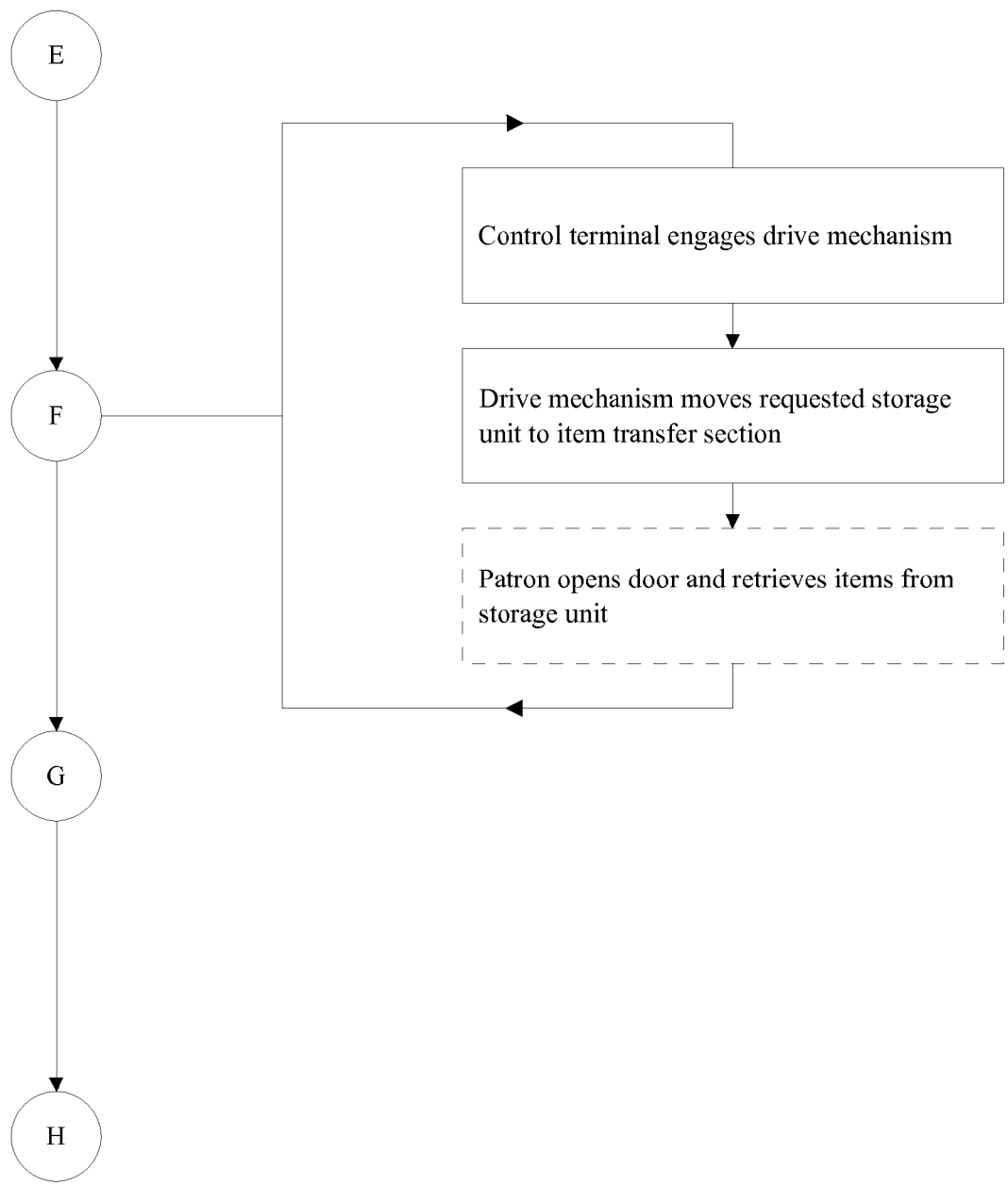
FIG. 15 is a flow diagram illustrating a secondary process utilized by the present invention to recall to the user the storage unit containing a user's items.
Figure 16:
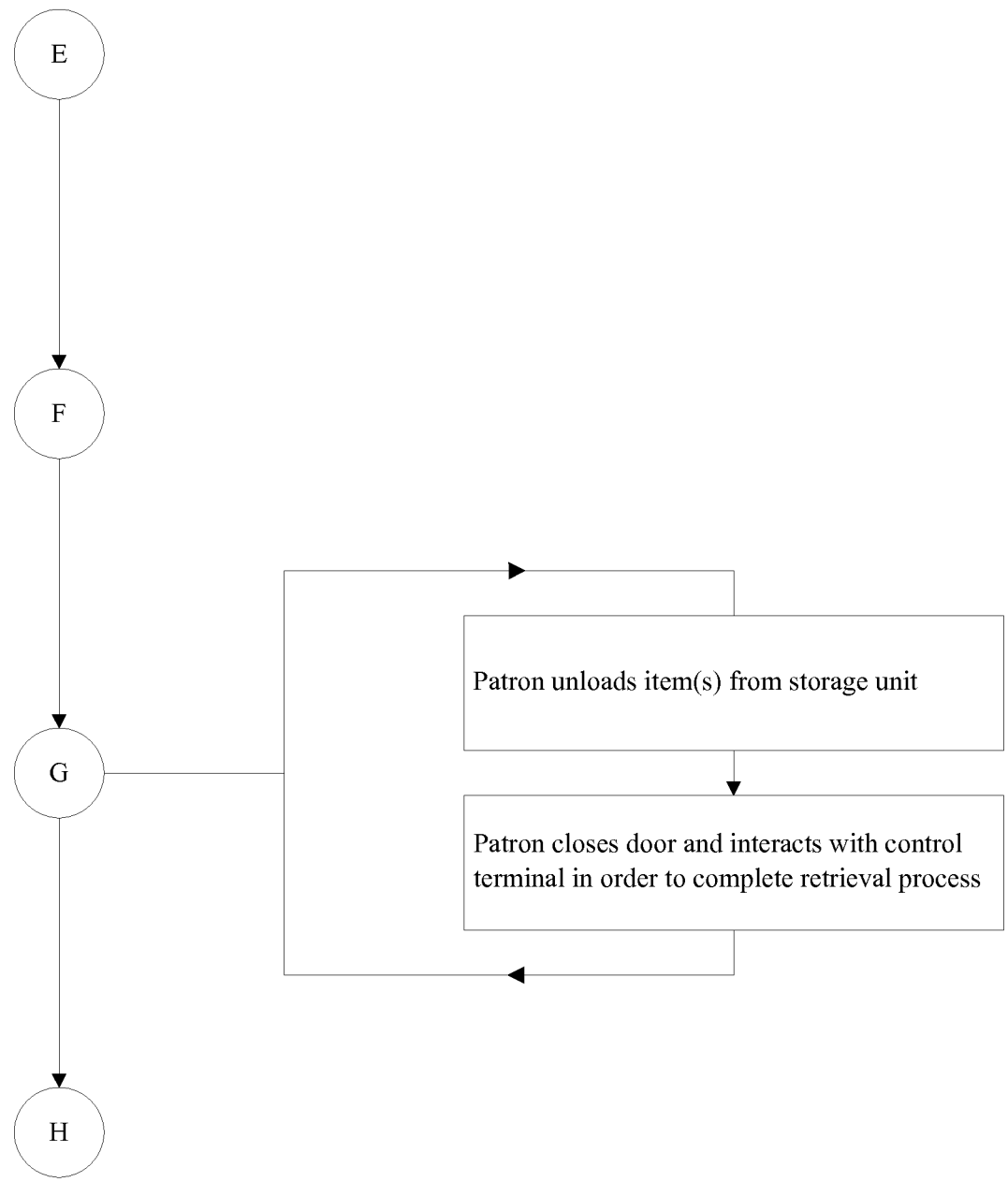
FIG. 16 is a flow diagram illustrating a secondary process utilized by the present invention to confirm when a user has finished collecting his or her items from a storage unit.

The payment mechanism described are optional components; different embodiments of the present invention may choose to support cash payments, card payments, or even both. Additional payment methods beyond those previously mentioned are also possible. For example, in an embodiment that includes the wireless communication module 35, payments can be made through a smart phone; a number of applications and services are provided that support this, often classified as "mobile payment services". Other physical payments can also be accommodated, examples of which include checks (e.g. personal or cashier's). The potential components of the control terminal are illustrated in FIG. 1, FIG. 2, and FIG. 7. Examples of specific implementations for these components include touchscreens, trackballs, computer keyboards, buttons, a credit/debit card slot, a coin slot, image and barcode scanners, speakers, and the like.

Potentially, accounts can be utilized and personal identification information can automatically be drawn from electronic payment methods, such as credit cards. Additionally, the patron may enter a password (to generate a new account or access an existing account). As mentioned, certain personal information, such as the name of the patron, can be gathered from the credit and debit card. The control terminal 3 may also ask the patron to supply a name, e-mail address, phone number, or other piece of information to help identify the patron when he or she returns later to retrieve his or her items.

The present invention, as thus far describes, serves as a coat check system which supports convenient storage and retrieval of person effects. The present invention can be installed and utilized in a variety of environments, an example of which is subsequently provided. Charts outlining this process are provided as FIG. 8-FIG. 16.

When a patron arrives at an establishment that makes use of the present invention, the patron moves to the control terminal 3 in order to interact with the present invention. The interface of the control terminal 3 is preferably user-friendly, such that a patron is capable of interacting with the control terminal 3 without requiring training. However, some facilitates may choose to provide a dedicated attendant that operates the control terminal 3 on the patron's behalf.

The patron then uses the control terminal 3 to send a request to the conveyor assembly 1 to move an empty storage unit 2 to the item transfer section 4. The client is able to enter the command by means of the user input device 32 of the control terminal 3. Any pertinent information, such as charges for use of the storage unit 2 or instructions on how to operate the control terminal 3, can be provided to the patron via the information output device 33.

When the patron requests an empty storage unit 2, the processing unit 34 of the control terminal 3 checks a database of storage units 2; each of the storage units 2 has associated data including an identifier and an occupancy status. As a result, the control terminal 3 can identify individual storage units 2 from the plurality of storage units 2 in addition to identifying which storage units 2 are empty and which are occupied. This control terminal 3 thus uses the database in order to call an empty storage units 2 for a patron to deposit personal effects in. The database also allows the control terminal 3 to call a desired storage units 2 for item retrieval, as later detailed.

The patron's request for an empty storage units 2 causes the control terminal 3 to engage the drive mechanism 11. The control terminal 3 maintains engagement of the drive mechanism 11 in order to move the storage units 2 along the track 12. The drive mechanism 11 is disengaged once an empty storage units 2 (as identified through the database) is moved to the item transfer section 4. The patron is then able to access the empty storage unit 2 through the item transfer section 4. Coats, hats, umbrellas, handbags, and ultimately any item the patron desires may be placed in the storage unit 2. The database is updated to tag the specific storage unit 2 as occupied, and the patron is provided an identification code that allows them to request their assigned storage unit 2 when they are ready to retrieve their items, such as when leaving the establishment. The identification code is preferably randomly and securely generated, such that the identification code for a given individual storage unit 2 changes between each use. Effectively, the identification code is temporary, being generated when the patron deposits their belongings and being deleted when the patron retrieves their belongings. In essence, the identification serves as a digital key that prevents unauthorized access (e.g. persons other than the patron to the storage unit 2. Potentially, a physical key can be provided for the patron (whether attached to the storage unit 2 or the control terminal 3) in order to provide an additional layer of security; however, patrons are often looking to minimize the amount of items on their person, making the physical key undesirable. The physical key could also be lost or stolen, creating unnecessary risks associated with use of the present invention. Ideally, the identification key (provided though the information output device 33) serves as a suitable level of security for patrons' belongings.

After depositing their items, the patron marks the depositing as completed via the control terminal 3. The control terminal 3 then engages the drive mechanism 11 to move the newly occupied storage unit 2 along the track 12, away from the item transfer section 4. The patron can then go about their business in the establishment as normal, knowing their belongings are securely stored thanks to the present invention. Meanwhile, the present invention is capable of receiving deposits from new patrons while allowing for retrieval of belongings of departing patrons.

When the patron is ready to leave the establishment, they return to the control terminal 3, where they can make a retrieval request. The control terminal 3 prompts the patron for the identification code they received when originally depositing their belongings. If the establishment chooses to charge patrons for use of the present invention, the control terminal 3 will request the patron makes a payment before allowing the patron to proceed with item retrieval; an example process of making the payment is provided shortly hereafter. The patron inputs the identification code, which the control terminal 3 checks against the database in order to identify the storage unit 2 assigned to the patron. The control terminal 3 then engages the drive mechanism 11 in order to move the patron's storage unit 2 along the track 12 to the item transfer section 4. Once the storage unit 2 arrives at the item transfer section 4, the control terminal 3 disengages the drive mechanism 11 and the patron is able to gather their belongings from the storage unit 2.

Once finished gathering said belongings, the patron confirms through the terminal that they have completed emptying their belongings. In embodiments that include a weight sensor 22, a buzzer will sound if items are still detected in the storage unit 2. Otherwise, the control terminal 3 engages the drive mechanism 11 to move the newly emptied (and thus available) storage unit 2 away from the item transfer section 4.

In establishments where charges are levied for use of the present invention, the patron must make a payment (whether physical or electronic) before being allowed to retrieved their stored items. The patron, if using cash, inserts coins and bills into the cash deposit receptacle 36, with change being provided through the cash dispensing bin 37. Alternatively, electronic payments (i.e. credit card or debit cards) may be made through the card reader 38. Potentially, wireless payments (for which there are a number of current and emerging mobile software) can be made through a patron's mobile device. Patrons may also choose to access information regarding their possessions and assigned storage unit 2 via their mobile device, for example by receiving texts or e-mails. Such payments can be received and confirmed through the wireless communication module 35 of the control terminal 3.

Although the invention has been explained in relation to its preferred embodiment, it is to be understood that many other possible modifications and variations can be made without departing from the spirit and scope of the invention as hereinafter claimed.

What is claimed is:

1. A coat check system comprises:
   a conveyor assembly;
   a plurality of storage units;
   a control terminal;
   the conveyor assembly comprises a drive mechanism, a track, and a conveyor enclosure;
   the conveyor enclosure being laterally positioned around the track and the drive mechanism;
   the plurality of storage units being moveably engaged along the track;
   the drive mechanism being mechanically integrated along the track, wherein the drive mechanism is used to move the plurality of storage units along the track;
   the control terminal being communicably coupled to the drive mechanism, wherein the control terminal controls movement of the drive mechanism;
   each of the plurality of storage units being an enclosed container;
   a door;
   the enclosed container comprises a lateral surface; and
   the door being hingedly connected to the lateral surface, adjacent to an opening of the lateral surface.

2. The coat check system as claimed in claim 1 comprises:
   an item transfer section, wherein personal items are deposited into and retrieved from one of the plurality of storage units at the item transfer section;
   the item transfer section being integrated into the conveyor enclosure;

the control terminal being positioned exterior to the conveyor enclosure; and
the control terminal being positioned adjacent to the item transfer section.

3. The coat check system as claimed in claim 1 comprises:
the track being a close-ended loop.

4. The coat check system as claimed in claim 1 comprises:
a weight sensor; and
the weight sensor being integrated into the enclosed container, wherein the weight sensor is used to detect an object within the enclosed container.

5. The coat check system as claimed in claim 1 comprises:
a drain;
the enclosed container comprises a floor; and
the drain being integrated through the floor.

6. The coat check system as claimed in claim 1 comprises:
an air vent; and
the air vent being integrated through the lateral surface.

7. The coat check system as claimed in claim 1 comprises:
the control terminal comprises a housing, a user input device, an information output device, and a processing unit;
the user input device being externally mounted onto the housing;
the information output device being mounted onto the housing;
the processing unit being mounted within into the housing;
the processing unit being electronically connected with the user input device and the information output device; and
the processing unit being communicably coupled with the drive mechanism of the conveyor assembly.

8. The coat check system as claimed in claim 7 comprises:
a wireless communication module;
the wireless communication module being mounted within into the housing; and
the processing unit being electronically coupled with the wireless communication module.

9. The coat check system as claimed in claim 7 comprises:
the control terminal comprises a cash deposit receptacle;
the control terminal comprises a cash dispensing bin;
the cash deposit receptacle being integrated into the housing;
the cash dispensing bin being integrated into the housing; and
the processing unit being electronically connected to the cash dispensing bin and the cash deposit receptacle.

10. The coat check system as claimed in claim 7 comprises:
the control terminal comprises a card reader;
the card reader being integrated into the housing; and
the processing unit being electronically connected to the card reader.

11. A coat check system comprises:
a conveyor assembly;
a plurality of storage units;
a control terminal;
an item transfer section, wherein personal items are deposited into and retrieved from one of the plurality of storage units at the item transfer section;
the conveyor assembly comprises a drive mechanism, a track, and a conveyor enclosure;
each of the plurality of storage units being an enclosed container;
the control terminal comprises a housing, a user input device, an information output device, and a processing unit;
the track being a close-ended loop;
the conveyor enclosure being laterally positioned around the track and the drive mechanism;
the plurality of storage units being moveably engaged along the track;
the drive mechanism being mechanically integrated along the track, wherein the drive mechanism is used to move the plurality of storage units along the track;
the control terminal being communicably coupled to the drive mechanism, wherein the control terminal controls movement of the drive mechanism;
the item transfer section being integrated into the conveyor enclosure;
the control terminal being positioned exterior to the conveyor enclosure;
the control terminal being positioned adjacent to the item transfer section;
the user input device being externally mounted onto the housing;
the information output device being mounted onto the housing;
the processing unit being mounted within into the housing;
the processing unit being electronically connected with the user input device and the information output device;
the processing unit being communicably coupled with the drive mechanism of the conveyor assembly;
a door;
the enclosed container comprises a lateral surface; and
the door being hingedly connected to the lateral surface, adjacent to an opening of the lateral surface.

12. The coat check system as claimed in claim 11 comprises:
a weight sensor; and
the weight sensor being integrated into the enclosed container, wherein the weight sensor is used to detect an object within the enclosed container.

13. The coat check system as claimed in claim 11 comprises:
a drain
the enclosed container comprises a floor; and
the drain being integrated through the floor.

14. The coat check system as claimed in claim 11 comprises:
an air vent; and
the air vent being integrated through the lateral surface.

15. The coat check system as claimed in claim 11 comprises:
a wireless communication module;
the wireless communication module being mounted within into the housing; and
the processing unit being electronically coupled with the wireless communication module.

16. The coat check system as claimed in claim 11 comprises:
the control terminal comprises a cash deposit receptacle;
the control terminal comprises a cash dispensing bin;
the cash deposit receptacle being integrated into the housing;
the cash dispensing bin being integrated into the housing; and
the processing unit being electronically connected to the cash dispensing bin and the cash deposit receptacle.

17. The coat check system as claimed in claim 11 comprises:
   the control terminal comprises a card reader;
   the card reader being integrated into the housing; and
   the processing unit being electronically connected to the card reader.

* * * * *